(12) United States Patent
Custodis et al.

(10) Patent No.: US 7,862,200 B2
(45) Date of Patent: Jan. 4, 2011

(54) LAMP ARRANGEMENT

(75) Inventors: Udo Custodis, Hong Kong (CN);
Werner Schmidts, Ottobrunn (DE)

(73) Assignee: Osram Gesellschaft mit beschraenkter Haftung, Munich (DE)

( * ) Notice: Subject to any disclaimer, the term of this patent is extended or adjusted under 35 U.S.C. 154(b) by 24 days.

(21) Appl. No.: 11/988,506

(22) PCT Filed: Jul. 4, 2006

(86) PCT No.: PCT/DE2006/001156
§ 371 (c)(1),
(2), (4) Date: Jan. 9, 2008

(87) PCT Pub. No.: WO2007/006265
PCT Pub. Date: Jan. 18, 2007

(65) Prior Publication Data
US 2009/0135591 A1    May 28, 2009

(30) Foreign Application Priority Data
Jul. 11, 2005   (DE) .................. 10 2005 032 314

(51) Int. Cl.
*F21V 21/00*   (2006.01)
(52) U.S. Cl. ............. 362/217.06; 362/216; 362/249.02; 362/228; 362/249.14; 362/229

(58) Field of Classification Search ................ 362/260, 362/263, 216, 217.01, 220–225, 217.05, 362/217.08, 217.09, 217.11, 249.01, 249.02, 362/249.06, 249.12–249.14, 228, 229; 313/318.03, 313/318.04
See application file for complete search history.

(56) References Cited

U.S. PATENT DOCUMENTS

| | | | |
|---|---|---|---|
| 6,400,104 B1 | 6/2002 | Ham | |
| 6,642,659 B1 * | 11/2003 | Hsieh | 315/56 |
| 7,195,367 B2 * | 3/2007 | Hong et al. | 362/97.3 |
| 7,252,409 B2 * | 8/2007 | Kim | 362/294 |
| 2004/0257807 A1 * | 12/2004 | Endo et al. | 362/247 |
| 2006/0023447 A1 * | 2/2006 | Justel et al. | 362/231 |
| 2006/0146527 A1 * | 7/2006 | VanderSchuit | 362/228 |

FOREIGN PATENT DOCUMENTS

| | | |
|---|---|---|
| DE | 201 16 719 | 12/2001 |
| WO | WO 02/062106 | 8/2002 |
| WO | WO 03/059013 | 7/2003 |
| WO | 2005003625 A1 | 1/2005 |

* cited by examiner

*Primary Examiner*—Thomas M Sember

(57) ABSTRACT

A lamp arrangement is disclosed, with at least one low-pressure discharge lamp, in particular, a compact fluorescent lamp to generate a main illumination with at least one discharge bulb, fitted in a socket and at least one alternative light source, in particular, a light diode arrangement with at least one light diode (LED) for generation of an alternative illumination. According to the invention, the light diode arrangement is at least partly arranged in the vicinity of cold spots on the low pressure discharge lamp.

17 Claims, 6 Drawing Sheets

LAMP ARRANGEMENT

TECHNICAL FIELD

The invention relates to a lamp arrangement in accordance with the precharacterizing clause of patent claim 1.

PRIOR ART

The lamp arrangement in accordance with the invention can in principle be used in a large number of lamps with a base at one end. However, the main application area of the lamp arrangement should be in compact fluorescent lamps for general lighting which have at least one light-emitting diode (LED) as an alternative light source and are inserted into a base at one end.

Such a lamp arrangement is known, for example, from DE 201 16 719 U1. In the case of this lamp arrangement with a base at one end, a low-pressure discharge lamp in the form of a compact fluorescent lamp is used for producing a main illumination and a light-emitting diode arranged on the base of the compact fluorescent lamp is used for producing an alternative illumination. The discharge vessel of the compact fluorescent lamp comprises two discharge tubes, which are bent in the form of a U and are inserted into the base. The main illumination and the alternative illumination can be switched on via a wall switch and an electrical resistor which is connected in parallel therewith, the lamp arrangement being operated in the main illumination mode when the wall switch is switched on and in the alternative illumination mode when the wall switch is switched off. In order to prevent the lamp arrangement from switching to the alternative illumination mode given sufficient brightness and when the wall switch is switched off, a photoelement is provided.

Furthermore, WO 02/062106 A1 has disclosed a lamp arrangement with a compact fluorescent lamp with a base at one end for producing a main illumination and a light-emitting diode arrangement for producing an alternative illumination, in which the light-emitting diodes are arranged in an annular space on the base, which space is delimited by the discharge vessel and an envelope. This lamp arrangement provides control electronics, by means of which the lamp arrangement can be operated in the main illumination mode, alternative illumination mode or in both illumination modes simultaneously as a function of an actuation sequence of a wall switch.

One disadvantage with such lamp arrangements is the fact that the heat-sensitive light-emitting diodes are arranged in a region of electrode filaments (which are arranged in end sections of the discharge tubes and are heated so as to produce free electrons) which is subjected to a high thermal load. As a result of the thermal loading of the light-emitting diodes, the light emission decreases as the temperature of the discharge tubes increases. Furthermore, the thermal loading results in a reduced life of the light-emitting diodes and in their failure once the maximum operating temperature has been reached. The thermal loading of the light-emitting diodes is further intensified by an envelope used in the prior art in accordance with WO 02/062106 A1 owing to the reduced heat emission of the lamp arrangement and the thereby increasing internal temperature of the envelope.

DESCRIPTION OF THE INVENTION

The invention is based on the object of providing a lamp arrangement with at least one low-pressure discharge lamp for producing a main illumination and with at least one alternative light source, in particular a light-emitting diode arrangement, for producing an alternative illumination which makes improved light emission of the light-emitting diode arrangement possible in comparison with conventional solutions alongside an extended life.

This object is achieved according to the invention by a lamp arrangement with the combination of features in claim 1. Particularly advantageous embodiments of the invention are described in the dependent claims.

The lamp arrangement according to the invention has at least one low-pressure discharge lamp, in particular a compact fluorescent lamp for producing a main illumination, with at least one discharge vessel, which is inserted into a base, and at least one alternative light source, in particular a light-emitting diode arrangement with at least one light-emitting diode (LED) for producing an alternative illumination. According to the invention, at least sections of the light-emitting diode arrangement are arranged in the region of cold spots of the low-pressure discharge lamp. The cold spots form, in the case of conventional compact fluorescent lamps, in the region of the bends in the discharge tubes since these bends are furthest removed from the heated electrode filaments. As a result, the temperature in the region of the cold spots of the discharge vessel is minimal in relation to the end sections of the discharge tubes and the light-emitting diode arrangement is only subjected to a low thermal load. The effect of the cold spots can additionally be improved by the geometrical design of the discharge tubes, for example by small radii of the bends in the tube. Owing to the cold spots of the discharge vessel, the high lamp temperatures in the region of the electrode filaments can be compensated for, an optimum mercury vapor pressure in the discharge vessel is achieved and, as a result, the light emission of the compact fluorescent lamp is improved. This solution allows for a thermal loading of the light-emitting diode arrangement which is reduced in comparison with the prior art and, as a result, improved light emission since the working temperature can be set in a defined manner by the positioning of the light-emitting diode. As a result, increased light emission of the light-emitting diode arrangement in comparison with conventional solutions alongside an extended life is made possible.

In accordance with a particularly preferred exemplary embodiment of the invention, the lamp arrangement has at least one extender for accommodating the light-emitting diode arrangement, which extender is arranged in such a way that the light-emitting diodes are arranged substantially in the region of the cold spots of the compact fluorescent lamp.

It has proven to be particularly advantageous if the extender extends along a longitudinal axis of the base and the light-emitting diode arrangement is arranged on at least one end face of the extender.

Preferably, the extender is arranged on the outer face of a space cover of the base or inserted into a receptacle of the base cover.

In an exemplary embodiment according to the invention, the extender extends through the base cover and forms a holder for a manually actuable switch for changing between main illumination and alternative illumination.

In order to simplify the production of the lamp arrangement, the extender and the base cover are preferably designed to be integral.

In accordance with a preferred exemplary embodiment of the invention, the extender and/or the light-emitting diode arrangement are arranged in a space, at least sections of which are delimited by discharge vessels of the discharge lamp. The positioning of the light-emitting diode arrangement in the region of the discharge tubes, owing to the shading of the light-emitting diode arrangement for the discharge tubes, makes possible glare-free operation of the light-emitting diode arrangement (antiglare effect) and light guiding by means of reflection on the lamp vessel. As a result, directed light emission of the light-emitting diodes, for example for operation of the alternative illumination in a tasklight or reading light, is achieved.

The extender preferably has a substantially circular cross section. As a result of the shape, the extender requires little physical space and can be produced easily in terms of manufacturing technology.

In one variant in accordance with the invention, the extender is matched on the circumferential side substantially to the contour of the discharge vessel. As a result, a compact design of the lamp arrangement given a maximum end face area of the extender is achieved, so that one or more light-emitting diodes can be arranged on the end face.

Preferably, at least sections of the extender have an approximately triangular cross section.

It has proven to be particularly advantageous if the light-emitting diode arrangement has at least three light-emitting diodes, which are arranged at corner regions, which laterally delimit the end face of the extender.

In accordance with a further exemplary embodiment of the invention, the lamp arrangement has two extenders, which are arranged diametrically with respect to one another and are arranged in such a way that they are offset substantially through approximately 90° with respect to a plane of the longitudinal axes of longitudinal tube sections of the discharge vessel.

In a preferred embodiment of the invention, electronic component parts of the light-emitting diode arrangement, for example a capacitor and a resistor, are accommodated in the extender. As a result, a compact design of the lamp arrangement is achieved.

In order to minimize undesirable parasitic light of the light-emitting diodes and to achieve a defined emission angle and as a result a maximum quantity of light per unit area, the light-emitting diodes have an integrated lens optic and/or at least sections of them are covered by a light-guiding optical lens. As a result, a defined emission cone of the light-emitting diodes and a homogeneous light intensity, as is necessary in particular for a tasklight, is achieved.

In an exemplary embodiment, at least sections of the light-emitting diode are surrounded by a reflector, which makes possible additionally focusing of the beams emitted by the light-emitting diode.

The lamp arrangement preferably has an electronically or manually actuable switch for changing between main illumination and alternative illumination. In this case, the switch can be arranged in the base of the lamp, the compactness of the lamp arrangement thereby being further improved.

In a preferred exemplary embodiment of the invention, the lamp arrangement has at least one energy store, for example a rechargeable battery, for operating the low-pressure discharge lamp and/or the light-emitting diode arrangement. As a result, the lamp arrangement is suitable for autonomous illumination tasks for example in marker lights (waymarkers/ escape route markers) and for other applications in the event of failure of the mains supply.

In this exemplary embodiment, the lamp arrangement preferably has an electronically or manually actuable switch for changing between mains operation and energy store operation of the lamp.

This makes either a mains operation or energy store operation of the low pressure discharge lamp and/or light-emitting diode arrangement possible.

In accordance with a further exemplary embodiment according to the invention, the lamp arrangement has at least one light sensor for detecting the incident light and control electronics for driving the alternative light source and/or the low pressure discharge lamp. As a result, the lamp arrangement is suitable for autonomous illumination tasks, for example in the exterior lighting sector.

BRIEF DESCRIPTION OF THE DRAWINGS

The invention will be explained in more detail below with reference to preferred exemplary embodiments. In the drawings.

PREFERRED EMBODIMENT OF THE INVENTION

The invention will be explained below with reference to a lamp arrangement with a base at one end and with a compact fluorescent lamp for producing a main illumination and with a light-emitting diode arrangement for producing an alternative illumination. As has already been mentioned at the outset, the lamp arrangement according to the invention is in no way restricted to such lamp types, however.

Figure 1:
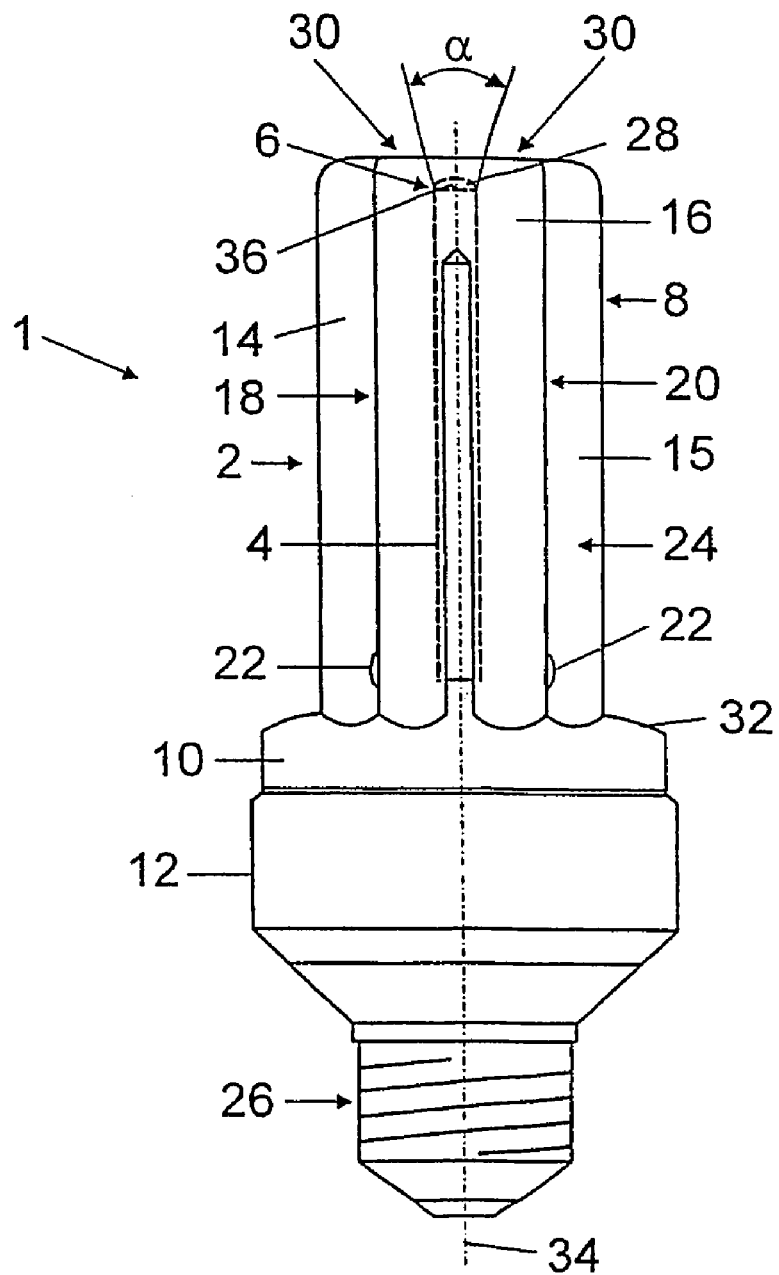
FIG. 1 shows a three-dimensional illustration of a first exemplary embodiment of a lamp arrangement according to the invention with three U-shaped discharge tubes.
Figure 2:
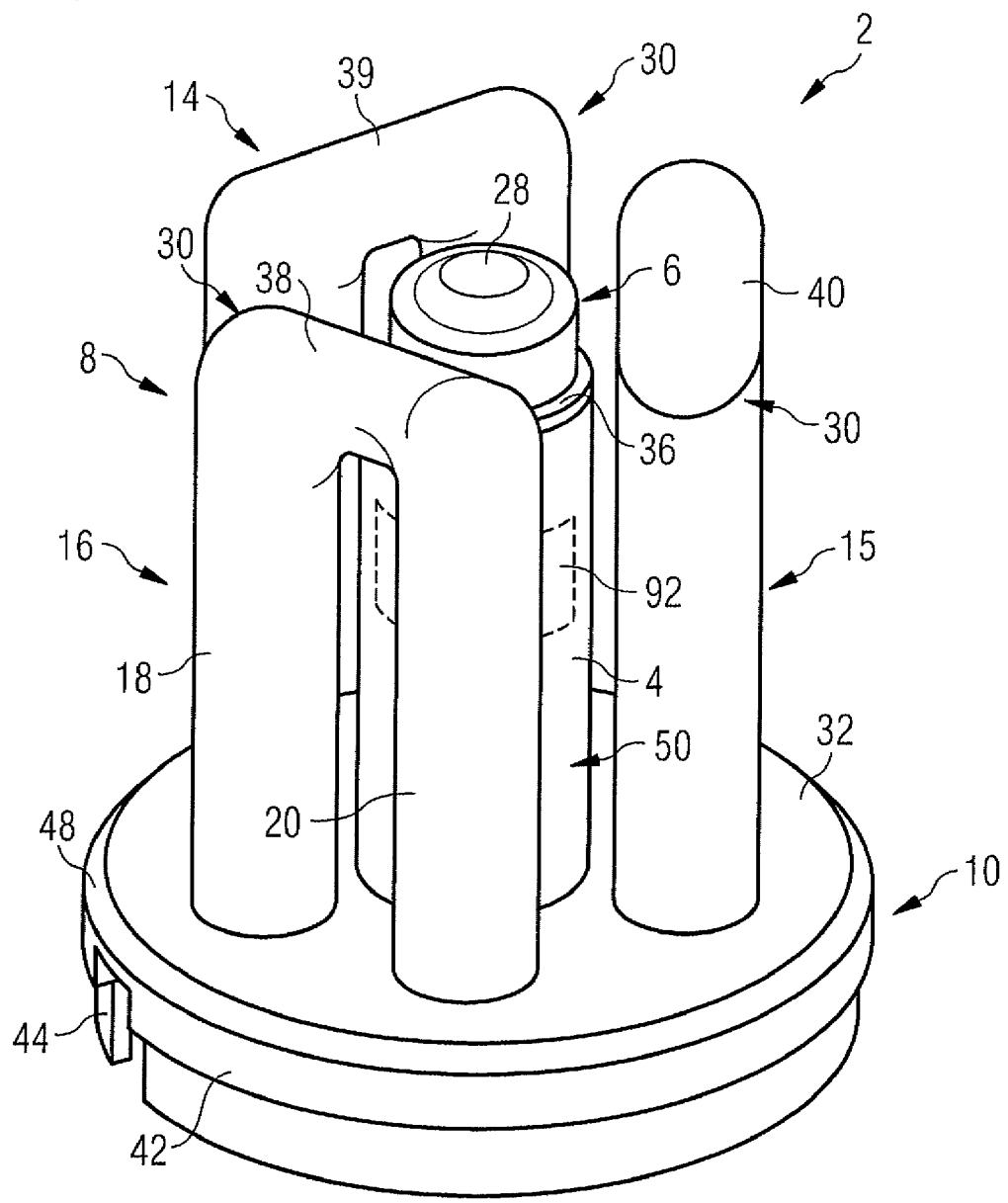
FIG. 2 shows a three-dimensional illustration of the lamp arrangement from FIG. 1 without the base housing.

First, FIGS. 1 and 2 will be used to explain a first exemplary embodiment of a lamp arrangement according to the invention in which the discharge vessel of the low-pressure discharge lamp is formed by three U-shaped discharge tubes.

FIG. 1 shows a schematic illustration of a lamp arrangement 1 according to the invention with a low-pressure discharge lamp in the form of a compact fluorescent lamp 2 for producing a main illumination and a light-emitting diode arrangement 6, which is arranged on an extender 4 illustrated by a dashed line, for producing an alternative illumination. The compact fluorescent lamp 2 has a discharge vessel 8, which is inserted into an approximately dome-shaped base cover 10 of a base 12 and is fixed therein via a joining compound, for example an adhesive or cement. The discharge vessel 8 of the compact fluorescent lamp 2 is formed by three U-shaped discharge tubes 14, 15, 16, which are arranged such that the planes in which longitudinal tube sections 18, 20 of each discharge tube 14, 15, 16 lie in section form an approximately equilateral triangle (see FIG. 2). The interiors of the discharge tubes 14, 15, 16 communicate via two hollow connecting webs 22, so that a single cohesive discharge space 24 is produced. The base-side ends of the longitudinal tube sections 18, 20 are sealed in a gas-tight manner by pinch seals or fuse seals (not illustrated), in each case one of the pinch seals of the discharge tubes 14, 16 having, in the region of the base cover 10, an electrode holder which is fused in in a gas-tight manner and bears an electrode filament for producing free electrons in the discharge vessel 8, which electrode filament acts as a cathode and is in each case connected to control electronics arranged in the basic body of the base 12 via two power supply lines (which is not illustrated). In order to accommodate and make electrical contact with the lamp arrangement 1 in a lampholder (not illustrated), a thread section 26 is formed on the base 12.

The light-emitting diode arrangement 6 provided for producing an alternative illumination in the exemplary embodiment shown comprises a single light-emitting diode (LED) 28 emitting white light. In an alternative variant of the invention, the light-emitting diode arrangement 6 comprises one or more multicolored light-emitting diodes. By means of a defined mixture of the three primary colors red, green and blue depending on the way in which they are driven these light-emitting diodes produce individual static color mixtures or defined color sequences. According to the invention, sections of the light-emitting diode arrangement 6 are arranged in the region of cold spots 30 of the discharge tubes 14, 15, 16. Said cold spots 30 in the case of the compact fluorescent lamp 2 shown are formed in the region of the bends in the discharge tubes 14, 15, 16 since these bends in the tube are furthest removed from the heated electrode filament. The effect of the cold spots 30 is additionally improved by the geometric configuration of the discharge tubes 14, 15, 16 with small radii for the bends in the tubes at which the excess mercury of the lamp filling can condense and assumes an optimum temperature of approximately from 30 to 50° C. As a result, the temperature in the region of the cold spots 30 of the discharge vessel 8 is minimal in relation to the end sections of the discharge tubes 14, 15, 16, and the light-emitting diode 28 is only subjected to a low thermal load. This solution makes possible light emission which is improved in comparison with the prior art alongside an extended life of the light-emitting diode 28. As a result of the cold spots 30 of the discharge vessel 8, furthermore the high lamp temperatures in the region of the electrode filaments are compensated for, an optimum mercury vapor pressure in the discharge vessel 8 is achieved and, as a result, the light emission of the compact fluorescent lamp 2 is improved.

In order to position the light-emitting diode 28 in the region of the cold spots 30 of the discharge tubes 14, 15, 16, the extender 4 is arranged centrally on an outer face 32 of the base cover 10 and extends on the lamp side along a longitudinal axis 34 of the base 10. The light-emitting diode 28 is arranged on an end face 36 of the extender 4, which end face is designed to be drawn back axially in comparison with horizontal sections 38, 39, 40 (see FIG. 2) of the discharge tube 14, 15, 16. The positioning of the light-emitting diode 28 in the region of the discharge tube 14, 15, 16, owing to the shading of the discharge tubes 14, 15, 16, allows glare-free operation of the light-emitting diode 28 (antiglare effect) and light guiding by means of reflection on the lamp vessel 8. As a result, a directed light emission of the light-emitting diode 28, for example for operation of the alternative illumination in a tasklight or reading light, is achieved. The extender 4 is in the form of a hollow body for the purpose of accommodating electronic component parts of the light-emitting diode arrangement 6, for example a capacitor and a resistor (not illustrated). As a result, a compact design of the lamp arrangement 1 is achieved. In order to simplify the production of the lamp arrangement 1, the extender 4 and the base cover 10 are designed to be integral, the extender 4 extending through the base cover 10 and forming a holder for a manually actuable slide of a switch for changing between main illumination and alternative illumination (which is not illustrated).

In the exemplary embodiment shown, a light-emitting diode 28 having a radial design is used as the light-emitting diode 28. In an alternative embodiment, a light-emitting diode with an SMT (surface mount technology) design is used which is mounted on the extender 4, for example via a mounting plate or a housing. In order to minimize undesirable parasitic light from the light-emitting diode 28 and to achieve a defined emission angle α with a maximum quantity of light per unit area, the light-emitting diode 28 has an integrated lens optic (not illustrated). In the exemplary embodiment shown, the emission angle α is approximately 30°. As an alternative to or in addition to the integrated lens optic, it is possible to cover at least sections of the light-emitting diode 28 with a light-guiding optical lens. Furthermore, sections of the light-emitting diode 28 can be surrounded by a reflector, which makes possible additional focusing of the beams emitted by the light-emitting diode 28.

The light-emitting diode arrangement 6 is operated via an electronic operating device or the electronic control gear (ECG) (not illustrated) of the compact fluorescent lamp 2. The electronic operating device or the electronic control gear (ECG) can be designed such that it is dimmable for the purpose of controlling the brightness of the lamp arrangement and/or be designed to have a sensor system for detecting the brightness. All the components and the entire system are designed for highest possible efficiency and luminous efficiency. As a result, a strong light emission is achieved with reduced energy consumption of the lamp arrangement 1. The lamp arrangement 1 according to the invention is suitable, for example, for efficient continuous use and for operation with solar energy as a result of the low energy consumption of the light-emitting diode arrangement 6.

As shown in FIG. 2, which shows a three-dimensional illustration of the lamp arrangement 1 shown in FIG. 1 without the base 12, the base cover 10 has, for the purpose of fixing it to the basic body of the base 12 (see FIG. 1), a circumferential wall 42 with a stepped design and with two approximately rectangular cutouts 44, 46 (the cutout 46 is hidden by the base cover 10) which are arranged diametrically with respect to one another for accommodating a manually actuable slide of the switch (not illustrated). The circumferential wall 42 merges with the base surface 32 via a peripheral bevel 48. The extender 4 has an approximately cylindrical cross section and is arranged centrally on the base cover 10 in a space 50, at least sections of which are delimited by the three U-shaped discharge tubes 14, 15, 16, the end face 36 of the extender 4 being designed to be axially drawn back with respect to the horizontal sections 38, 39, 40 of the discharge tubes 14, 15, 16 so that the light-emitting diode 28, in accordance with the invention, is arranged in the region of the cold spots 30 of the discharge tubes 14, 15, 16. As a result, as has already been explained with reference to FIG. 1, an improved light emission is made possible alongside an extended life of the light-emitting diode 28 and the directed light emission of the light-emitting diode 28 by reflection on the lamp vessels 14, 15, 16 is further improved. As a result of the shading of the light-emitting diode 28 by the discharge tubes 14, 15, 16, furthermore an antiglare effect of the light-emitting diode 28 is achieved. Electronic component parts 92 of the light emitting diode arrangement, for example a capacitor and a resistor, are incorporated into the extender 4.

Figure 3:
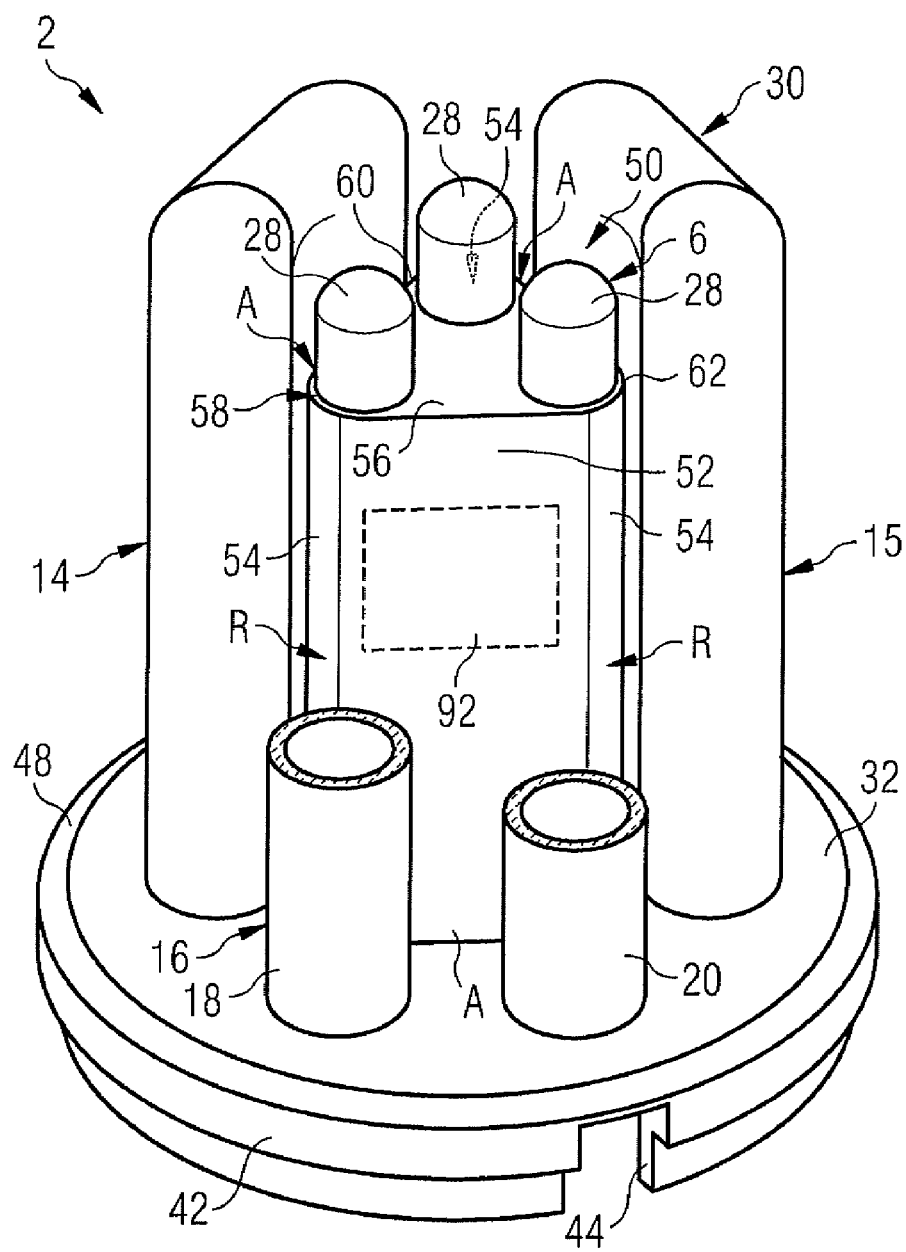
FIG. 3 shows a three-dimensional illustration of a second exemplary embodiment of a lamp arrangement according to the invention with an extender matched to the contour of the discharge vessel.

FIG. 3 illustrates an embodiment of the lamp arrangement 1 according to the invention with an extender 52 which is matched on the circumferential side, represented by A and R, to the contour of the discharge vessel 8. This exemplary embodiment differs from the previously described exemplary embodiment substantially by virtue of the fact that the extender 52 has an approximately triangular cross section and, at longitudinal edges 54, is provided with radii R, sections of which are matched to the contour of the light-emitting diode 28. As a result, a compact design of the lamp arrangement 1 and an enlarged end face 56 of the extender 52 in comparison with the extender 4 shown in FIG. 2 is achieved, so that a plurality of light-emitting diodes 28 can be arranged on the end face 56. In the exemplary embodiment shown, the light-emitting diode arrangement 6 comprises three light-emitting diodes 28, which are arranged at corner regions 58, 60, 62 on the end face 56 of the extender 52. Electronic component parts 92 of the light emitting diode arrangement, for example a capacitor and a resistor, are incorporated into the extender 52.

Figure 4:
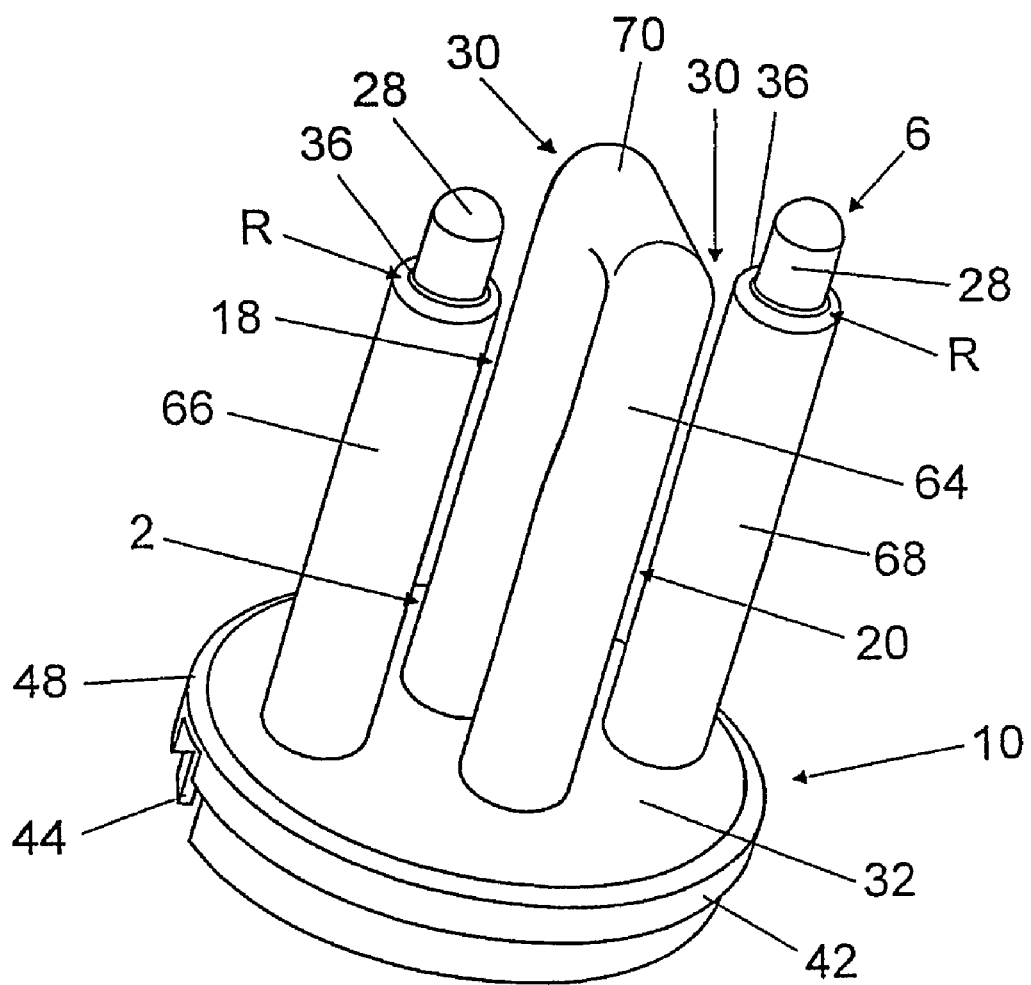
FIG. 4 shows a three-dimensional illustration of a third embodiment according to the invention of a lamp arrangement in which the discharge vessel is formed by a single U-shaped discharge tube.

As shown in FIG. 4, which shows an exemplary embodiment of a lamp arrangement 1 according to the invention with a discharge vessel 8 formed by a single discharge tube 64 bent in the form of a U, the lamp arrangement 1 in this variant has two extenders 66, 68, which are arranged diametrically with respect to one another and each bear a light-emitting diode 28. The extenders 66, 68 are arranged in such a way that they are offset through approximately 90° with respect to a plane of the longitudinal axes of longitudinal tube sections 18, 20 of the discharge vessel 8 and have a substantially circular cross section, which merges with the end face 36 for accommodating the light-emitting diodes 28 on the lamp side via a radius R. The end faces 36 of the extenders 66, 68 are designed to be axially drawn back with respect to a horizontal section 70 of the discharge tube 64, so that the light-emitting diodes 28, according to the invention, are arranged in the region of the cold spots 30 of the discharge tube 64.

Figure 5:
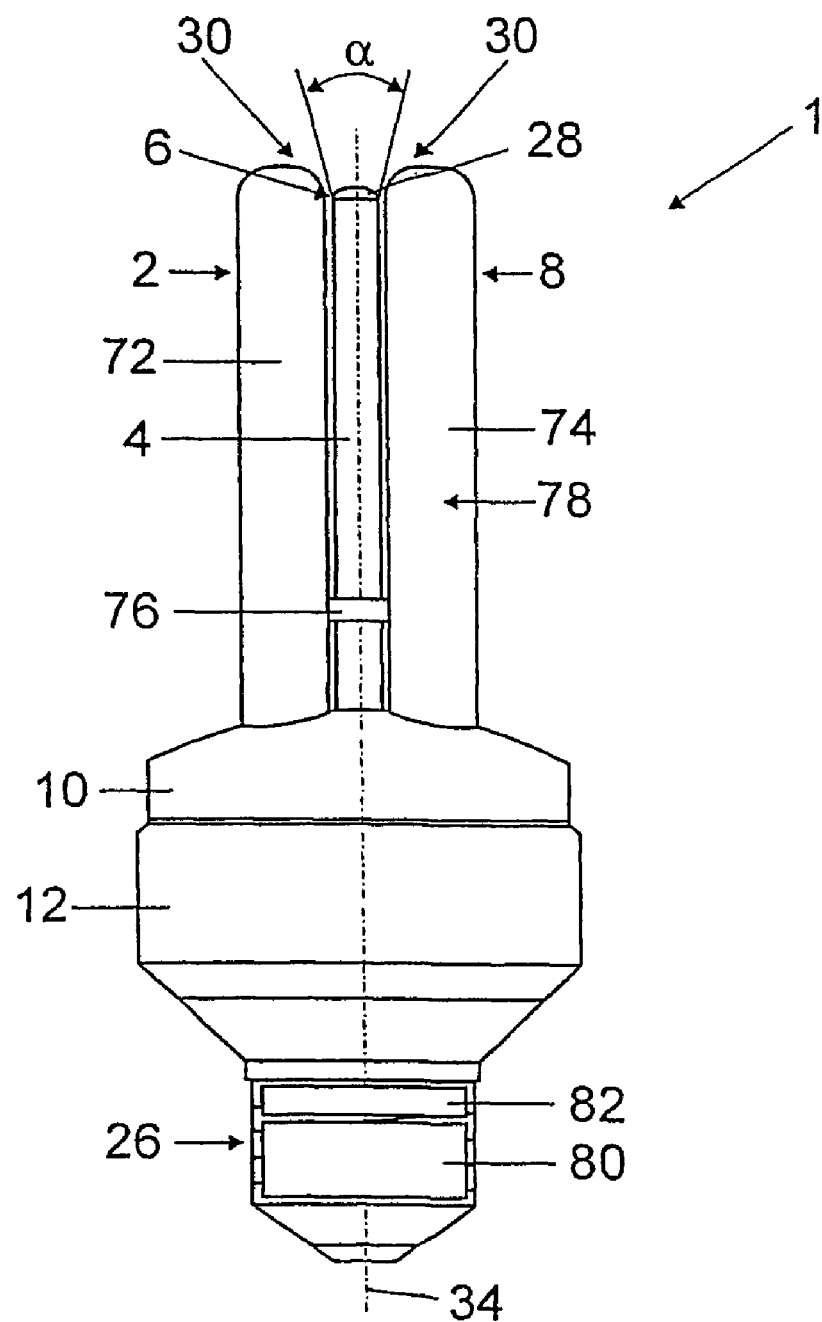
FIG. 5 shows a three-dimensional illustration of a fourth exemplary embodiment according to the invention of a lamp arrangement with an energy store arranged in the base.

FIG. 5 shows an exemplary embodiment of the lamp arrangement 1 according to the invention in which the discharge vessel 8 is formed by two discharge tubes 72, 74, which are arranged next to one another and which each have two longitudinal tube sections 18, 20 running parallel to one another (see FIG. 2).

The two U-shaped discharge tubes 72, 74 are arranged next to one another in such a way that the two longitudinal tube sections 18, 20 each lie in planes running parallel to one another, the interiors of the discharge tubes 72, 74 communicating via a hollow connecting web 76 so that a single cohesive discharge space 78 is produced. In the exemplary embodiment shown in FIG. 5, the lamp arrangement 1 has an energy store, which is in the form of a rechargeable battery 80 and is used for operating the compact fluorescent lamp 2 and the light-emitting diode 28 for example in the event of failure of the mains supply. As a result, either mains operation or energy store operation of the compact fluorescent lamp 2 and the light-emitting diode 28 is possible, the rechargeable battery 80 being charged during mains operation via an electronic arrangement 82 with a rechargeable battery management system. As a result, the lamp arrangement 1 is suitable for autonomous emergency lighting for example in marker lights (waymarkers/escape route markers) and for other applications (camping etc.) in the event of failure of the mains supply.

In order to change between main illumination and alternative illumination or mains operation and energy store operation, the lamp arrangement 1 has a manually actuable switch (not illustrated), which makes possible the operating states of the lamp arrangement 1 which are explained in more detail below via three switch positions.

In a first switch position the compact fluorescent lamp 2 is operated with mains voltage when the light-emitting diode 28 is switched off, for example for the general lighting of an area. In this case, mains voltage is understood to mean an AC voltage with, for example, 110 to 240 V or a low voltage with, for example, 12 to 48 V DC. In the second switch position of the switch, the light-emitting diode 28 is operated with mains voltage, the compact fluorescent lamp 2 not being in operation.

As a result, targeted illumination, for example of a workdesk, is achieved with substantially reduced energy consumption. The third switch position is used, for example, for the emergency lighting without mains supply. For this purpose, the light-emitting diode 28 is operated via the rechargeable battery 80, the compact fluorescent lamp 2 being switched off. In an alternative variant of the lamp arrangement 1, further switch positions can be provided, for example for the mains-independent energy store operation of the compact fluorescent lamp 2.

Figure 6:
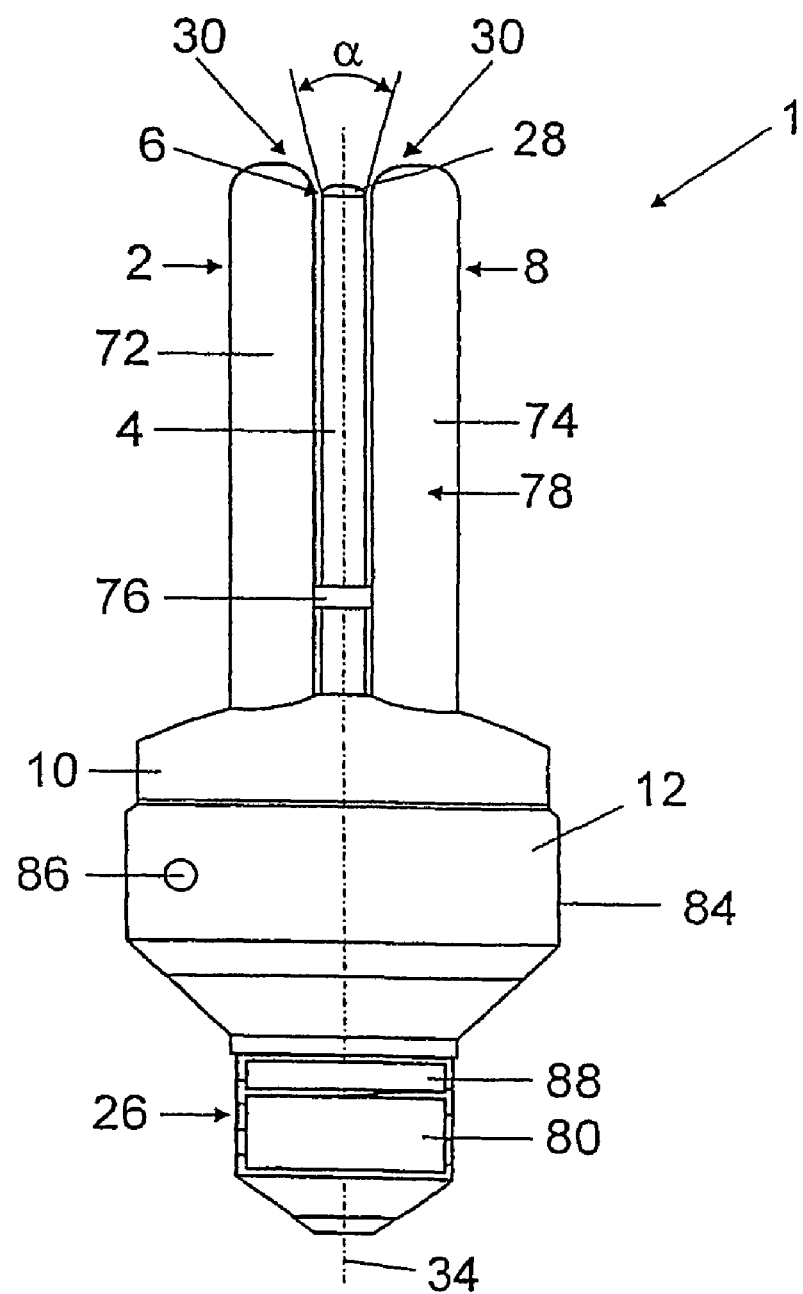
FIG. 6 shows a three-dimensional illustration of a further exemplary embodiment according to the invention of a lamp arrangement with a light sensor arranged on the outer circumference of the base.

FIG. 6 shows an exemplary embodiment of the lamp arrangement 1 according to the invention in which a sensor is provided for light/dark detection. This variant differs from the abovedescribed exemplary embodiment substantially by virtue of the fact that a light sensor 86, for example an infrared sensor, is arranged on an outer circumference 84 of the base 12, via which light sensor the light intensity of the incident light or its infrared component can be detected. In order to evaluate the sensor signals and drive the light-emitting diode 28, control electronics 88 are accommodated in the interior of the base 12. When daylight is incident or during operation of the compact fluorescent lamp 2, the sensor signal is at a level which is substantially above a switch-on threshold stored in the control electronics 88, i.e. the light-emitting diode 28 is switched off. As darkness sets in and when the compact fluorescent lamp 2 is switched off, for example in the event of failure of the mains supply during the night, the sensor signal from the light sensor 86 becomes weaker and falls below the switch-on threshold, so that the control electronics identifies the environment state "dark" and generates a control signal for switching on the light-emitting diode 28. In the case of complete darkness, the sensor signal remains at a constant low level and only increases towards the threshold value again as brightness sets in in the morning hours or once the compact fluorescent lamp 2 has been switched on. When a predetermined switch-off threshold is reached, which does not necessarily correspond to the switch-on threshold, the light-emitting diode 28 is switched off. In the exemplary embodiment shown, the light-emitting diode 28 is supplied with energy in a mains-independent manner via the rechargeable battery 80. For this purpose, the rechargeable battery 80 has a capacitance which is sufficient for bridging a nighttime dark phase of approximately 10 hours. Owing to the light sensor 86, the lamp arrangement 1 is suitable for autonomous illumination tasks, for example in the exterior lighting sector, the light-emitting diode 28 being supplied via the rechargeable battery 80 in the event of failure of the mains supply. In an alternative variant of the lamp arrangement 1, for example in the case of a stable mains supply, it is possible to dispense with the rechargeable battery 80, and the light-emitting diode 28 can be operated via the mains supply. Furthermore it is possible to drive the compact fluorescent lamp 2 via the light sensor 86 as a function of brightness.

The lamp arrangement 1 according to the invention is not restricted to the abovedescribed exemplary embodiments. Thus, for example, any switch arrangement known from the prior art, in particular also an electronic switch, can be used for changing between general illumination and alternative illumination. Furthermore, the discharge vessel 8 of the compact fluorescent lamp 2 may have more than three discharge tubes and/or the discharge tubes may form a plurality of discharge vessels with separate discharge spaces 24. Critical to the invention is an arrangement of the light-emitting diodes 28 in the thermally uncritical region of the cold spots 30 of the discharge vessel 8 so that increased light emission of the light-emitting diode arrangement 6 and an extended life are achieved.

The invention discloses a lamp arrangement 1 with at least one low-pressure discharge lamp 2, in particular a compact fluorescent lamp for producing a main illumination with at least one discharge vessel 8, which is inserted into a base 12, and with at least one alternative light source 6, in particular a light-emitting diode arrangement with at least one light-emitting diode (LED) 28 for producing an alternative illumination. According to the invention, at least sections of the light-emitting diode arrangement 6 are arranged in the region of cold spots 30 of the low-pressure discharge lamp 2.

The invention claimed is:

1. A lamp arrangement with at least one compact fluorescent lamp for producing a main illumination, with at least one discharge vessel, which is inserted into a base, and with at least one alternative light source, the at least one alternative light source comprising a light-emitting diode arrangement with at least one light-emitting diode (LED) for producing an alternative illumination, wherein at least sections of the light-emitting diode arrangement are arranged in a region of cold spots of the discharge vessel, the lamp arrangement having at least one extender for accommodating the light-emitting diode arrangement, the extender extending substantially along a longitudinal axis of the base, and the light-emitting diode arrangement being arranged on at least one end face of the extender.

2. The lamp arrangement as claimed in claim 1, the extender and/or the light-emitting diode arrangement being arranged in a space, at least sections of which are delimited by the discharge vessel of the compact fluorescent lamp.

3. The lamp arrangement as claimed in claim 1, the extender having a substantially circular cross section.

4. The lamp arrangement as claimed in claim 1, the lamp arrangement having two extenders which are arranged diametrically with respect to one another.

5. The lamp arrangement as claimed in claim 4, the longitudinal axes of the extenders being arranged in such a way that they are offset substantially through approximately 90° with respect to a plane of the longitudinal axes of longitudinal tube sections of the discharge vessel.

6. The lamp arrangement as claimed in claim 1, the extender accommodating electrical component parts of the light-emitting diode arrangement.

7. The lamp arrangement as claimed in claim 1, the lamp arrangement having at least one energy store.

8. The lamp arrangement as claimed in claim 7, wherein the energy store is a rechargeable battery for operating the low-pressure discharge lamp and/or light-emitting diode arrangement.

9. The lamp arrangement as claimed in claim 1, the lamp arrangement having at least one light sensor for detecting the incident light and control electronics for driving the alternative light source and/or the low-pressure discharge lamp.

10. A lamp arrangement with at least one compact fluorescent lamp for producing a main illumination, with at least one discharge vessel, which is inserted into a base, and with at least one alternative light source, the at least one alternative light source comprising a light-emitting diode arrangement with at least one light-emitting diode (LED) for producing an alternative illumination, wherein at least sections of the light-emitting diode arrangement are arranged in a region of cold spots of the discharge vessel, the lamp arrangement having at least one extender, the extender being arranged on an outer face of a base cover of the base.

11. The lamp arrangement as claimed in claim 10, the extender and the base cover being designed to be integral.

12. The lamp arrangement as claimed in claim 10, the lamp arrangement having at least one energy store.

13. The lamp arrangement as claimed in claim 12, wherein the energy store is a rechargeable battery for operating the low-pressure discharge lamp and/or light-emitting diode arrangement.

14. The lamp arrangement as claimed in claim 10, the lamp arrangement having at least one light sensor for detecting the incident light and control electronics for driving the alternative light source and/or the low-pressure discharge lamp.

15. A lamp arrangement with at least one compact fluorescent lamp for producing a main illumination, with at least one discharge vessel, which is inserted into a base, and with at least one alternative light source, the at least one alternative light source comprising a light-emitting diode arrangement with at least one light-emitting diode (LED) for producing an alternative illumination, wherein at least sections of the light-emitting diode arrangement are arranged in a region of cold spots of the discharge vessel, the lamp arrangement having at least one extender for accommodating the light-emitting diode arrangement, the extender and/or the light-emitting diode arrangement being arranged in a space, at least sections of which are delimited by the discharge vessel of the compact fluorescent lamp in which the extender comprises a circumferential side and in which the discharge vessel comprises a contour, the extender being matched on the circumferential side substantially to the contour of the discharge vessel.

16. The lamp arrangement as claimed in claim 15, at least sections of the extender having an approximately triangular cross section.

17. The lamp arrangement as claimed in claim 16, in which the extender comprises an end face, the light-emitting diode arrangement having at least three light-emitting diodes, which are arranged on corner regions, which laterally delimit the end face of the extender.

* * * * *